United States Patent

Takahata et al.

[11] Patent Number: 5,314,868
[45] Date of Patent: May 24, 1994

[54] BEARING DEVICE

[75] Inventors: Ryoichi Takahata, Yamatotakada; Hirochika Ueyama, Hirakata, both of Japan

[73] Assignee: Koyo Seiko Co., Ltd., Osaka, Japan

[21] Appl. No.: 924,873

[22] Filed: Aug. 6, 1992

[30] Foreign Application Priority Data

Aug. 6, 1991 [JP] Japan ................................ 3-196548
Jul. 15, 1992 [JP] Japan ................................ 4-187928

[51] Int. Cl.⁵ .......................................... H01B 12/00
[52] U.S. Cl. .................................... 505/166; 310/10; 310/52; 310/90.5
[58] Field of Search ................... 310/90.5, 10, 40 R, 310/52, 68 B; 505/1, 876, 877, 878

[56] References Cited

U.S. PATENT DOCUMENTS

| | | | |
|---|---|---|---|
| 4,079,273 | 3/1978 | Lambrecht | 310/52 |
| 4,626,754 | 12/1986 | Habermann et al. | 318/460 |
| 4,686,404 | 8/1987 | Nakazeki et al. | 310/90.5 |
| 4,839,550 | 6/1989 | Mizuno et al. | 310/90.5 |
| 4,908,347 | 3/1990 | Denk | 505/1 |
| 4,956,571 | 9/1990 | Gordon | 310/90.5 |
| 5,027,280 | 6/1991 | Ando et al. | 364/474.16 |
| 5,126,611 | 6/1992 | Armstrong | 310/90.5 |
| 5,130,558 | 7/1992 | Armstrong | 310/90.5 |
| 5,177,387 | 1/1993 | McMichael | 310/90.5 |
| 5,196,748 | 3/1993 | Rigney | 310/90.5 |

FOREIGN PATENT DOCUMENTS

| | | |
|---|---|---|
| 193609 | 10/1986 | European Pat. Off. . |
| 466041A3 | 1/1992 | European Pat. Off. . |
| 466041A2 | 1/1992 | European Pat. Off. . |
| 2565310 | 12/1985 | France . |
| 1046016 | 2/1989 | Japan . |
| 2136061 | 8/1990 | Japan . |
| 2248715 | 12/1990 | Japan . |
| 4-165119 | 10/1992 | Japan ................................ 32/4 |
| 90/03524 | 4/1990 | PCT Int'l Appl. . |
| 2130655 | 6/1984 | United Kingdom . |

*Primary Examiner*—R. Skudy
*Attorney, Agent, or Firm*—Mason, Fenwick & Lawrence

[57] ABSTRACT

A bearing device for supporting a rotary body relative to a fixed portion in a noncontact state includes a superconducting bearing assembly comprising an annular permanent magnet portion fixedly mounted on the rotary body concentrically therewith and an annular superconductor portion disposed as opposed to the permanent magnet portion. A magnetic bearing assembly is disposed axially away from the superconducting bearing assembly and comprises electromagnets for controlling the position of the rotary body with respect to two radial directions orthogonal to each other.

15 Claims, 6 Drawing Sheets

BEARING DEVICE

BACKGROUND OF THE INVENTION

The present invention relates to bearing devices comprising a rotary body and bearing means for supporting the rotary body relative to a fixed portion in a noncontact state.

Magnetic bearing devices of the five-axis control type are already known which comprise a rotary body and bearing means for supporting the rotary body relative to a fixed portion without contacting the body. These magnetic bearing devices generally comprise an axial magnetic bearing, two radial magnetic bearings provided toward one end of the rotary body and operable in directions orthogonal to each other, two radial magnetic bearings arranged toward the other end of the rotary body and operable in directions orthogonal to each other, an axial displacement sensor, and eight radial displacement sensors. Each of the magnetic bearings has two electromagnets.

However, the conventional magnetic bearing device of the type mentioned requires the use of large electromagnets since the rotary body is supported relative to the fixed portion in a noncontact state by the attraction of the electromagnets. Moreover, the device has the problem that the need to hold the electromagnets energized always during the rotation of the rotary body results in an increased power consumption and entails a higher cost.

Superconducting bearing devices are considered useful as bearing devices of reduced cost. The present applicant has already proposed a superconducting bearing device which comprises a permanent magnet provided on a rotary body, and a superconductor disposed as opposed to the magnet, the permanent magnet being so mounted on the rotary body that the rotation of the rotary body will not alter the magnetic flux distribution around the axis of rotation of the body, the superconductor permitting the penetration of magnetic flux of the permanent magnet thereinto and being disposed at a position which is spaced apart from the magnet by a distance permitting a predetermined quantity of magnetic flux thereof to penetrate thereinto and which will not permit the rotation of the rotary body to alter the distribution of penetrating magnetic flux (see Japanese Patent Application HEI 2-293256). With this device, the rotary body can be supported relative to a fixed portion in a noncontact state merely by cooling the superconductor.

In the case of the superconducting bearing device, however, the magnet carrying portion of the rotary body has a low characteristic frequency, which gives rise to resonance to cause a radial deflection of the rotary body while the rotary body is still in low-speed rotation after the start of rotation before stabilized rotation is attained. In the case where the rotary body is rotated, for example, by a high frequency electric motor which comprises a rotor attached to the rotary body and a stator disposed around the rotor, the radial deflection, if occurring, permits the rotor to undergo a rotational deflection. This rotational deflection is further aggravated by a magnetic imbalance of the motor, consequently causing the rotor to contact the stator to damage or break the motor.

SUMMARY OF THE INVENTION

An object of the invention is to provide a bearing device which is less costly than the known magnetic bearing device of the five-axis control type.

Another object of the invention is to solve the problem encountered with the conventional superconducting bearing device and to provide a bearing device which is operable free of damage to or break of the electric motor or the like for driving the rotary body.

Other objects of the invention will become apparent from the following description.

The bearing device of the present invention has a rotary body, and bearing means for supporting the rotary body relative to a fixed portion in a noncontact state. The bearing device comprises a superconducting bearing assembly and a magnetic bearing assembly, the superconducting bearing assembly comprising an annular permanent magnet portion fixedly mounted on the rotary body concentrically therewith and an annular superconductor portion disposed as opposed to the permanent magnet portion, the magnetic bearing assembly being positioned axially away from the superconducting bearing assembly and including electromagnets for controlling the position of the rotary body with respect to two radial directions orthogonal to each other.

In an aspect of the invention, the magnetic bearing assembly is disposed at one side of the superconducting bearing assembly.

In another aspect of the invention, the magnetic bearing assembly is disposed at each of opposite sides of the superconducting bearing assembly.

Preferably, the bearing device is provided with a control unit for driving the electromagnets of the magnetic bearing assembly only when the rotary body resonates.

In this case, the device is preferably provided with a rotary body driving electric motor comprising a rotor attached to the rotary body, and a stator attached to the fixed portion and positioned around the rotor, a flywheel fixedly mounted on the rotary body, and means for converting kinetic energy stored in the flywheel during rotation of the rotary body to electrical energy while the electric motor is stopped and supplying the electrical energy to the control unit.

With the bearing device of the invention, the magnetic flux of the permanent magnet portion of the superconducting bearing assembly is pinned to the superconductor portion of the assembly and produces a restraining effect, whereby the permanent magnet portion and the superconductor portion are held spaced apart from each other by a predetermined distance in opposed relation. In this state, the rotary body carrying the permanent magnet portion thereon can be rotated about its own axis. The magnetic flux penetrating into the superconductor portion offers no resistance to the rotation at this time insofar as the distribution of flux is uniform and unchanged with respect to the axis of rotation. Accordingly, the rotary body can be supported in a noncontact state with respect to the axial and radial directions merely by bringing the permanent magnet portion on the rotary body to a specified position relative to the superconductor portion.

Upon the number of revolutions of the rotary body reaching a stable range, the rotary body is thus supportable relative to the fixed portion in a noncontact state only by the superconductor portion. This eliminates the need to use large electromagnets unlike the conventional magnetic bearing device of the five-axis control type, reduces the power needed for driving the electromagnets and results in a lower cost.

If the rotary body deflects with respect to two radial directions thereof orthogonal to each other owing to the resonance of the body occurring after the start of rotation before stabilized rotation is attained, the magnetic bearing assembly controls the position of the rotary body to correct the deflection. Further, for example when the rotary body in stable rotation is stopped, it is likely that the rotary body will resonate before complete stopping, deflecting with respect to the two radial directions of the body orthogonal to each other. The magnetic bearing assembly then controls the position of the rotary body to correct the deflection. This obviates damage or breakage of the high-frequency electric motor or the like that would otherwise result from the deflection.

The deflection of the rotary body is corrected by driving the electromagnets of the magnetic bearing assembly by the control unit only in the event of resonance of the rotary body. This also serves to reduce the power consumption. As stated above, one of the embodiment of the invention is provided with a rotary body driving electric motor comprising a rotor attached to the rotary body, and a stator attached to the fixed portion and positioned around the rotor, a flywheel fixedly mounted on the rotary body, and means for converting kinetic energy stored in the flywheel during rotation of the rotary body to electrical energy while the electric motor is stopped and supplying the electrical energy to the control unit. In this case, electric power can be supplied to the control unit stably even in the event of power failure, ensuring correction of the deflection that would occur before the rotary body comes to a stop.

The present invention will be described in greater detail with reference to the accompanying drawings.

DESCRIPTION OF THE PREFERRED EMBODIMENTS

Throughout FIGS. 1 to 6, like parts are designated or by like reference numeral or symbols and will not be described repeatedly.

Figure 1:
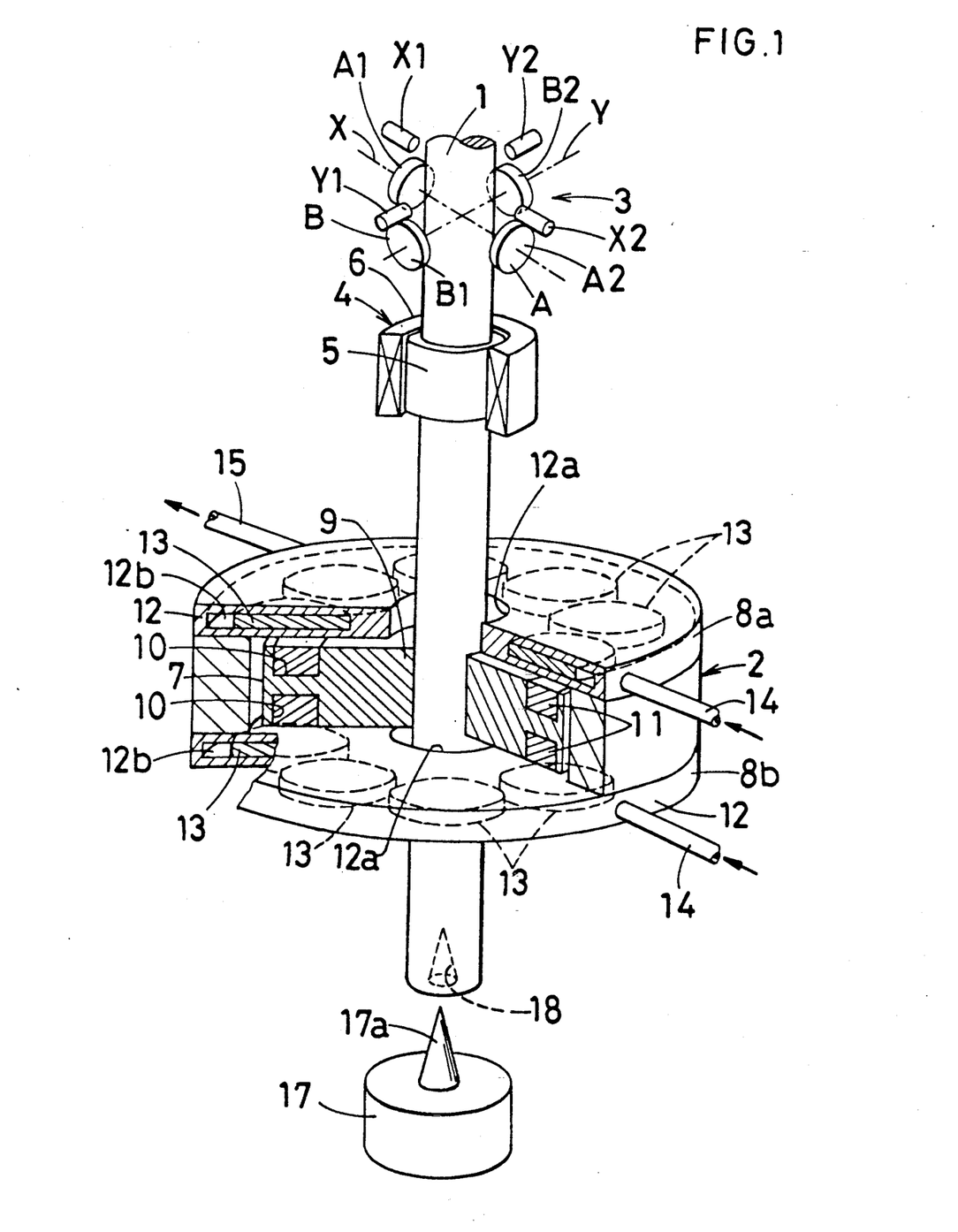
FIG. 1 is a perspective view partly broken away and schematically showing a bearing device as a first embodiment of the invention.
Figure 2:
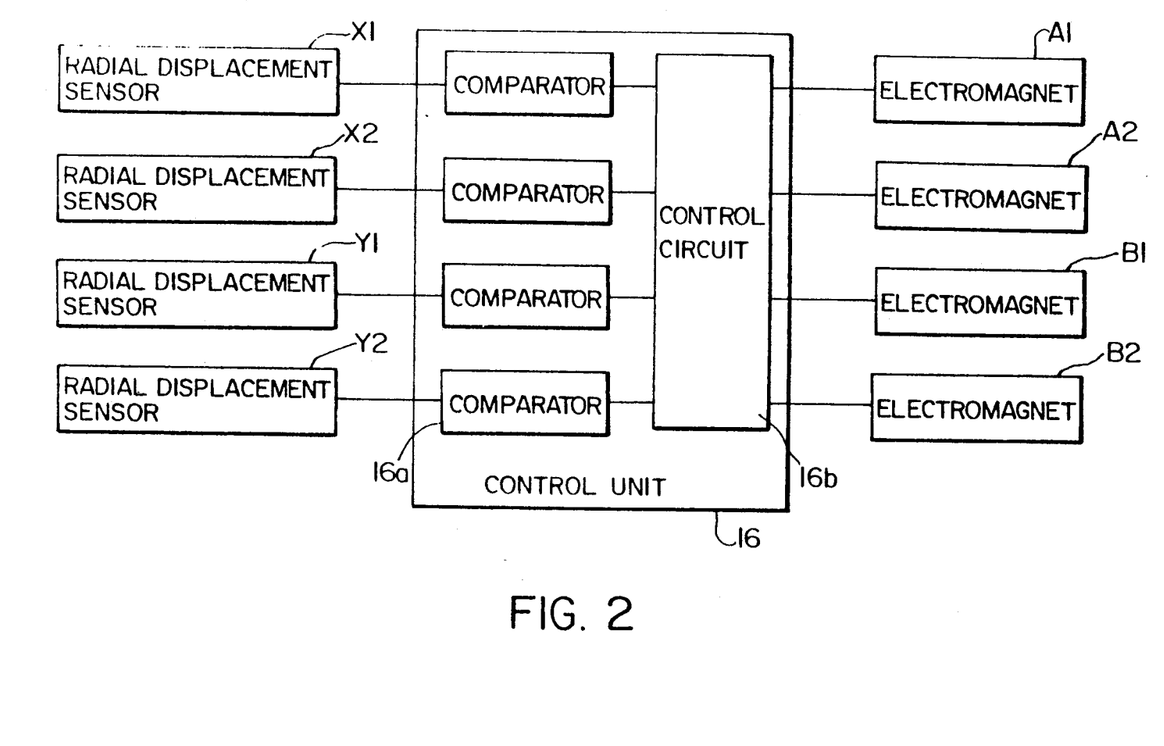
FIG. 2 is a block diagram showing an arrangement for controlling a magnetic bearing assembly of the bearing device of FIG. 1 as well as the other embodiments.

FIGS. 1 and 2 show a first embodiment of bearing device. With reference to FIG. 1 schematically showing the overall construction of the bearing device, the device comprises a rotary body 1 in the form of a vertical shaft, a superconducting bearing assembly 2, and a magnetic bearing assembly 3 upwardly spaced apart from the superconducting bearing assembly 2 and disposed at a portion of the rotary body 1 close to its upper end.

The rotary body 1 is supported by a fixed portion such as a housing or frame (not shown) for rotation at a high speed by a high-frequency electric drive motor 4. The motor 4 comprises a rotor 5 attached to the rotary body 1 at a portion thereof between the superconducting bearing assembly 2 and the magnetic bearing assembly 3, and a stator 6 disposed around the rotor 5 and fixedly mounted on an unillustrated fixed portion.

The superconducting bearing assembly 2 comprises a permanent magnet portion 7 in the form of a horizontal disk and mounted on the rotary body 1 concentrically therewith, and annular superconductor portions 8a, 8b arranged above and below the permanent magnet portion 7, spaced apart from and opposed to the upper and lower surfaces thereof, respectively, axially of the rotary body 1 and fixed to the fixed portion.

The permanent magnet portion 7 includes a horizontal disk 9 made, for example, of copper and fixed to the rotary body 1. The disk 9 has annular grooves 10 formed in its upper and lower surfaces, respectively, and concentric with the rotary body 1. An annular permanent magnet 11 is fixedly fitted in each of the grooves 10. The permanent magnets 11 are so arranged that the rotation of the rotary body 1 will not alter a magnetic flux distribution around the axis of rotation of the body 1.

Each of the annular superconductor portions 8a, 8b includes a horizontal ring 12 fixed to the fixed portion and made, for example, of copper or nonmagnetic stainless steel. The ring 12 is centrally formed with a bore 12a extending therethrough vertically, and the rotary body 1 is inserted through the bore 12a with a clearance formed around the body 1. The ring 12 is internally formed with an annular hollow portion 12b, in which a plurality of disklike superconductors 13 are arranged close to one another and equidistantly spaced apart circumferentially of the ring. All the superconductors 13 are equal in volume. A supply pipe 14 and a discharge pipe 15 for a cooling fluid are connected to the ring 12 in communication with the annular hollow portion 12b inside thereof. The supply pipe 14 and the discharge pipe 15 are connected to a cooling device via an unillustrated temperature control unit. The cooling fluid, which is for example liquid nitrogen, is circulated through the supply pipe 14, the hollow portion 12b and the discharge pipe 15 by the cooling device. The superconductors 13 are cooled with the fluid filling the interior of the hollow portion 12b.

The disklike superconductor 13 is prepared from a type II superconducting material and comprises a bulk of high-temperature superconducting material of the yttrium type, such as $YBa_2Cu_3O_x$, and normally conductive particles (of $Y_2Ba_1Cu_1$) uniformly mixed with the superconducting material. In an environment wherein type II superconductive state is realized, the superconductor 13 has properties to trap therein the magnetic flux released from the permanent magnet 11. The superconductor 13 is opposed to the permanent magnet 11 and disposed at a position which is spaced apart from the magnet 11 by a distance permitting a predetermined quantity of magnetic flux thereof to penetrate into the superconductor and which will not permit the rotation of the rotary body 1 to alter the distribution of penetrating flux.

Perpendicular axes (X-axis and Y-axis) in a common plane perpendicular to the axis of rotary body 1 extend in two radial directions relative to rotary body 1. The magnetic bearing assembly 3 comprises a control magnetic bearing A in the direction of X-axis, and a control magnetic bearing B in the direction of Y-axis. Each magnetic bearing A (B) comprises two electromagnets A1, A2 (B1, B2) so arranged on the X-axis (Y-axis) as to attract the rotary body 1 from opposite sides thereof. Radial displacement sensors X1, X2, Y1, Y2 are arranged in the vicinity of the electromagnets A1, A2, B1, B2, respectively. Each radial displacement sensor provides a sensor output signal indicative of the distance of the sensor from rotary body 1. The two displacement sensors X1, X2 are positioned along the X-axis on opposite sides of the rotary body 1 to detect the displacement along the X-axis of the portion of the rotary body 1 interposed between the sensors. The other two displacement sensors Y1, Y2 are arranged along the Y-axis on opposite sides of the rotary body 1 to detect the displacement of the rotary body portion in the direction of Y-axis.

FIG. 2 shows a typical arrangement relating to the control operation to be performed by the magnetic bearing assembly 3. With reference to FIG. 2, the electromagnets A1, A2, B1, B2 and the radial displacement sensors X1, X2, Y1, Y2 are connected to a control unit 16 for the magnetic bearing assembly 3. In the case where the rotary body 1 radially deflects from its centered home position owing to resonance, the control unit 16 detects the radial deflection of the rotary body 1 from the output of the radial displacement sensors X1, X2, Y1, Y2. Only when the control unit 16 has detected this displacement, the control unit 16 drives the electromagnets A1, A2, B1, B2 by energization based on the output from the radial displacement sensors X1, X2, Y1, Y2, whereby the position of the rotary body 1 is controlled to correct the radial deflection of the rotary body 1 and return it toward a home position centered in the magnetic bearing assembly.

More specifically, the control unit 16 of the magnetic bearing assembly 3 compares the sensor output signal voltage from the radial displacement sensors X1, X2, Y1, Y2 with a threshold voltage. The control unit 16 includes comparators 16a and a control circuit 16b, the comparators 16a provide output voltage which exceeds the threshold voltage when the output voltage from the sensors X1, X2, Y1, Y2 exceeds the threshold voltage, the control circuit 16b driving the electromagnets A1, A2, B1, B2 by means of the output from the comparators 16a. In the case where the rotary body 1 radially reflects owing to resonance, the comparators 16a of the control unit 16 compare the output from the radial displacement sensors X1, X2, Y1, Y2 with the threshold voltage and the comparators 16a provide output voltage to control circuit 16b which exceeds the threshold when the output from the sensors X1, X2, Y1, Y2 exceeds the threshold voltage. The control circuit 16b is of conventional type such as disclosed in U.S. Pat. Nos. 4,626,754; 4,839,550; 5,027,280; and 4,686,404 all of which are incorporated herein by reference. Control circuit 16b of the control unit 16 drives the electromagnets A1, A2, B1, B2 by energization based on the output from the comparators 16a, so that the electromagnets are activated to correct any deflection of rotary body 1 and return it to vertical orientation whereby the position of the rotary body 1 is maintained in a desired home position.

The bearing device described has means for determining the initial position of the rotary body 1 relative to the housing for the device (not shown) before operation as will be described below.

Disposed below the rotary body 1 is a lift member 17 which is movable upward and downward by known suitable means relative to the fixed portion. A conical projection 17a is formed on the upper end face of the lift member 17, while a conical cavity 18 for the projection 17a to fit in is formed in the lower end face of the rotary body 1 opposed to the upper end face. While the bearing device is in operation, the lift member 17 is in a lowered position in which the projection 17a is out of intimate contact with the cavity portion 18.

The bearing device at rest is brought into operation in the following manner.

First, the lift member 17 is raised to a predetermined upper position. The rise of the lift member 17 causes the projection 17a thereon to intimately fit into the conical cavity 18 of the rotary body 1, lifting the rotary body 1. The conical projection 17a of the lift member 17 thus fitting into the conical cavity 18 of the rotary body 1 determines the position of the permanent magnet portion 7 relative to the superconductor portions 8a, 8b and also determines the position of the rotary body 1 relative to the fixed portion. The superconductors 13 are thereafter cooled with the cooling fluid circulated through the annular hollow portions 12b and thereby maintained in type II superconductive state. This causes large quantities of magnetic flux emitted from the permanent magnets 11 on the rotary body 1 to penetrate into the superconductors 13 and to be trapped therein (pinning). Since the superconductors 13 have normally conductive particles as uniformly dispersed therein, the superconductors 13 have a definite distribution of penetrating flux therein, whereby the rotary body 1 is restrained in position along with the permanent magnets 11 relative to the superconductors 13. Accordingly, the rotary body 1 is supported with respect to the axial and radial directions as held raised with high stability. Since the rotary body 1 resists both axial and radial movement, it is capable of supporting both axial and radial loads. The magnetic flux penetrating into the superconductors 13 offers no resistance to rotation at this time insofar as the magnetic flux distribution is uniform and unchanged with respect to the axis of rotation. When the superconductors 13 are brought into the superconductive state by cooling, a support force occurs as stated above, so that the lift member 17 is moved down to the lowered position to eliminate the support. When the rotary body is not supported by the lift member 17, the rotary body 1 slightly descends under gravity and is suspended in a stable position where the gravity force is in balance with the magnetic force of the superconducting bearing assembly 2 provided by the magnetic attraction force of the upper superconductor portion 8a and the magnetic repellent force of the lower superconducting portion 8b.

The rotary body 1 is then rotated by the high frequency electric motor 4. If the rotary body 1 resonates and consequently deflects radially before attaining stable rotation after starting, or before coming to a stop while rotating stably, the control unit 16 detects the radial deflection of the rotary body 1 from the output of the radial displacement sensors X1, X2, Y1, Y2 and drives the electromagnets A1, A2, B1, B2 by energization based on the output from the sensors X1, X2, Y1, Y2, whereby the position of the rotary body 1 is controlled to correct the radial deflection of the body 1. This obviates damage or breakage of the motor 4 due to the contact of the rotor 5 with the stator 6. Upon the correction of the deflection, the control unit 16 de-energizes the electromagnets A1, A2, B1, B2.

Although not shown, the foregoing embodiment preferably has a mechanical catcher bearing for supporting the rotary body 1 when the superconductors 13 of the superconductor portions 8a, 8b become normally conductive, failing to afford the support force. The bearing is provided between the fixed portion and the rotary body 1 at a location where they are opposed to each other.

Figure 3:
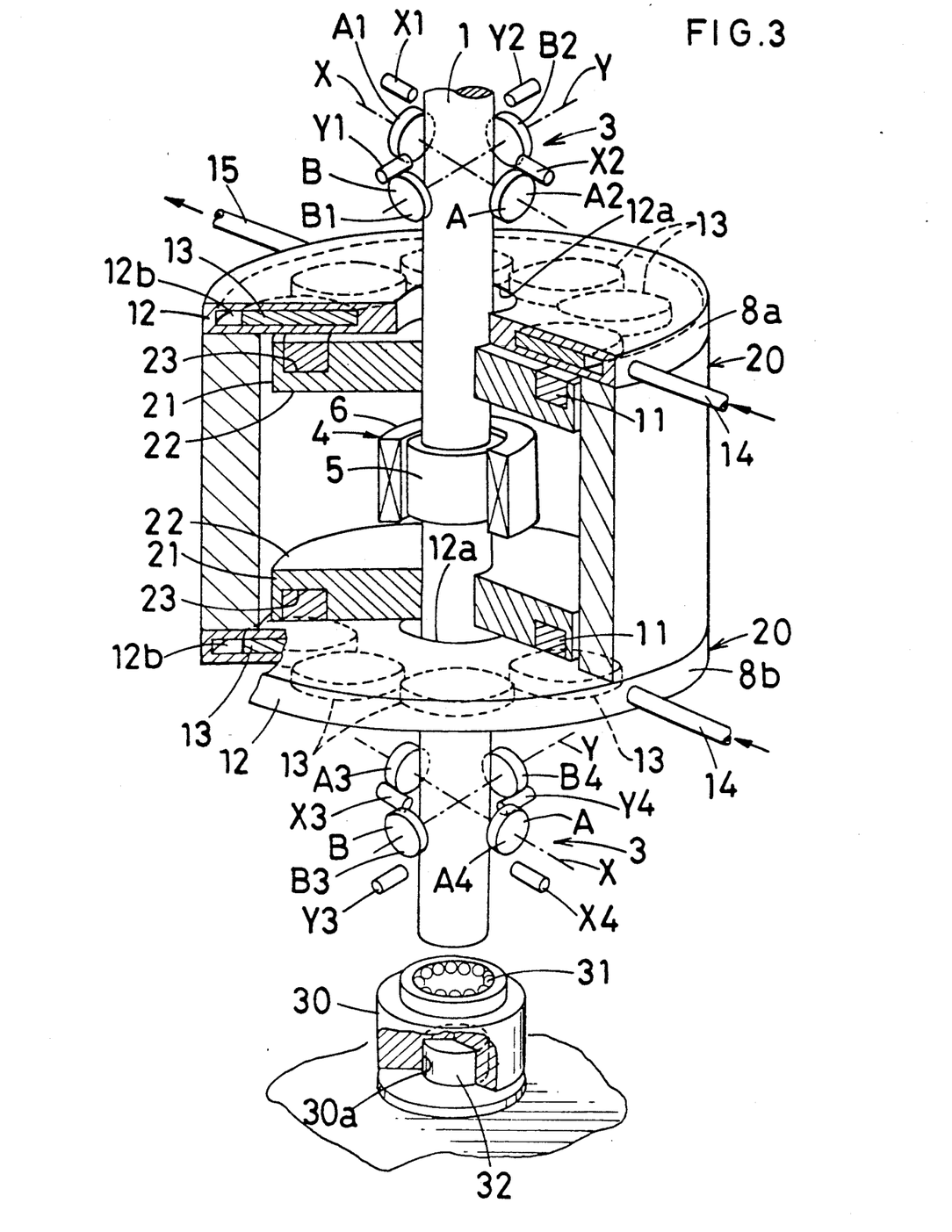
FIG. 3 is a perspective view partly broken away and schematically showing another bearing device as a second embodiment of the invention.

FIG. 3 shows a second embodiment of the invention.

With reference to FIG. 3 schematically showing the overall construction of the second embodiment of bearing device, a high-frequency electric motor 4 is provided on a rotary body 1 at the lengthwise midportion thereof. Superconducting bearing assemblies 20 are disposed above and below the motor 4, respectively. These bearing assemblies 20 comprise upper and lower annular superconductor portions 8a, 8b, and upper and lower horizontal disklike permanent magnet portions 21, 21 which are positioned closer to the motor 4 than the superconductor portions 8a, 8b and spaced apart from these portions 8a, 8b, respectively. An annular groove 23 concentric with the rotary body 1 is formed in the upper surface of a horizontal disk 22 of the upper permanent magnet portion 21, as well as in the lower surface of a horizontal disk 22 of the lower permanent magnet portion 21. An annular permanent magnet 11 is fixedly fitted in the groove 23.

A magnetic bearing assembly 3, comprising two control magnetic bearings A, B, is disposed above the upper superconductor portion 8a, as well as below the lower superconductor portion 8b. The control magnetic bearings A, B of the lower magnetic bearing assembly 3 include electromagnets A3, A4 and B3, B4, respectively. Radial displacement sensors X3, X4, Y3, Y4 are arranged in the vicinity of the electromagnets A3, A4, B3, B4, respectively. Although not shown, a control unit 16 has connected thereto the eight electromagnets A1 to A4, B1 to B4 of the two magnetic bearing assemblies 3, and the radial displacement sensors X1 to X4, Y1 to Y4. If the rotary body 1 radially deflects, the magnetic bearing assemblies 3 correct the deflection in the same manner as in the first embodiment.

Disposed below the rotary body 1 is a lift member 30 which is movable upward and downward relative to a fixed portion. The lift member 30 is provided on its upper end face with a mechanical catcher bearing 31 for supporting the rotary body 1 when the superconductors 13 of the superconductor portions 8a, 8b become normally conductive and fail to give a support force. When at rest, the rotary body 1 is supported by the catcher bearing 31. The lift member 30 is formed in its bottom end with a cylindrical cavity 30a having fitted therein, for example, the plunger 32 of an air cylinder provided on the fixed portion. The lift member 30 is movable upward and downward relative to the fixed portion by the operation of the air cylinder. While the bearing device is in operation, the lift member 30 is in a lowered position in which the lower end of the rotary body 1 is out of contact with the catcher bearing 31. According to the present embodiment, the initial position of the rotary body 1 relative to the fixed portion, i.e., the position of the permanent magnet portions 21 relative to the superconductor portions 8a, 8b, is determined by the lift member 30 and the magnetic bearing assemblies 3. The rotary body 1 is supported relative to the fixed portion in a non-contact state in the same manner as in the foregoing first embodiment.

FIG. 3 shows a third embodiment of bearing device of the invention which is adapted for use in an electric power storage apparatus.

Figure 4:
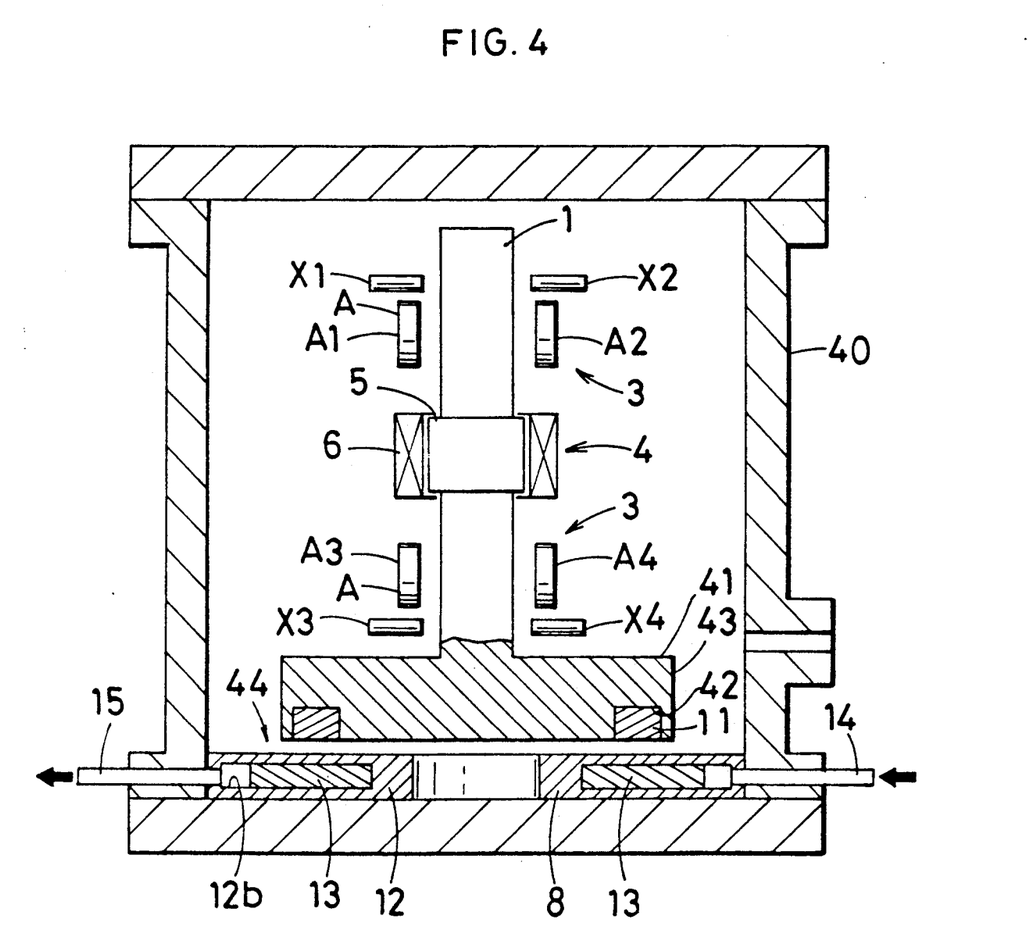
FIG. 4 is a view in vertical section schematically showing an electric power storage apparatus which has incorporated therein a third embodiment of bearing device of the invention.

With reference to FIG. 4 schematically showing the power storage apparatus, a rotary body 1 is provided within a vacuum chamber 40 and fixedly carries a flywheel 41 at its lower end. The flywheel 41 is formed in its lower surface with an annular groove 42 concentrically with the rotary body 1. An annular permanent magnet 11 is fixedly fitted in the groove 42. The flywheel 41 and the annular permanent magnet 11 provides a permanent magnet portion 43. Disposed below the permanent magnet portion 43 is an annular superconductor portion 8 which is opposed to and spaced apart from the lower surface of the flywheel 41 axially of the rotary body 1. The superconductor portion 8 is secured to the vacuum chamber 40. The permanent magnet portion 43 and the superconductor portion 8 provide a superconducting bearing assembly 44. FIG. 4 shows only control magnetic bearings A, in the direction of X-axis, of upper and lower magnetic bearing assemblies 3, electromagnets A1, A2, A3, A4 of the bearings A and radial displacement sensors X1, X2, X3, X4, but does not show upper and lower control magnetic bearings B in the direction of the Y-axis, electromagnets B1, B2, B3, B4 of the bearings B and radial displacement sensors Y1, Y2, Y3, Y4. Further although not shown, a lift member is provided for moving the rotary body 1 upward and downward. Preferably, a mechanical catcher bearing is provided for supporting the rotary body 1 when the superconductors 13 of the superconductor portion 8 become normally conductive, failing to afford a support force for the body. The bearing is provided between a fixed portion and the rotary body 1 at a location where they are opposed to each other.

Figure 5:
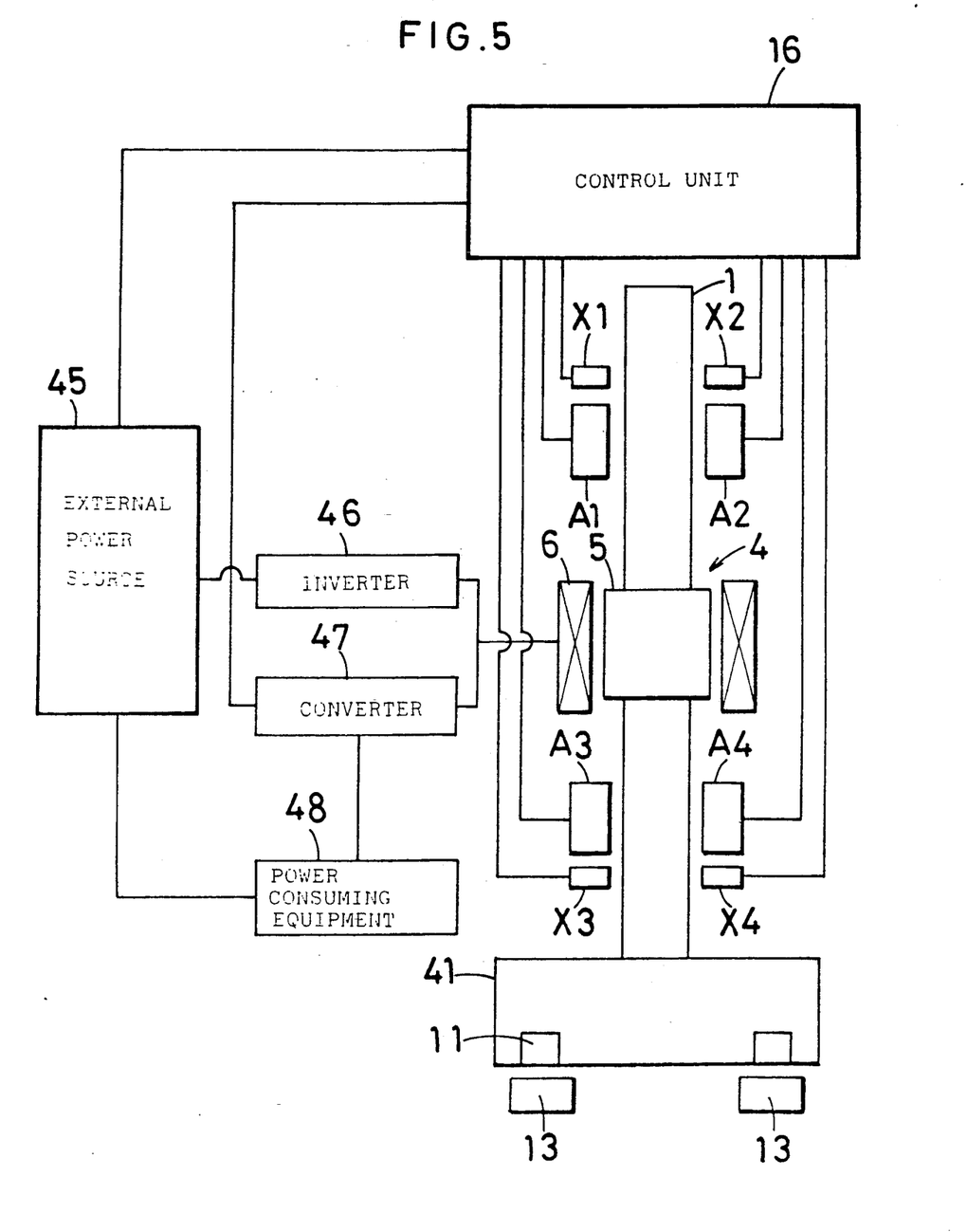
FIG. 5 is a diagram illustrating the principle of the power storage apparatus shown in FIG. 4.
Figure 6:
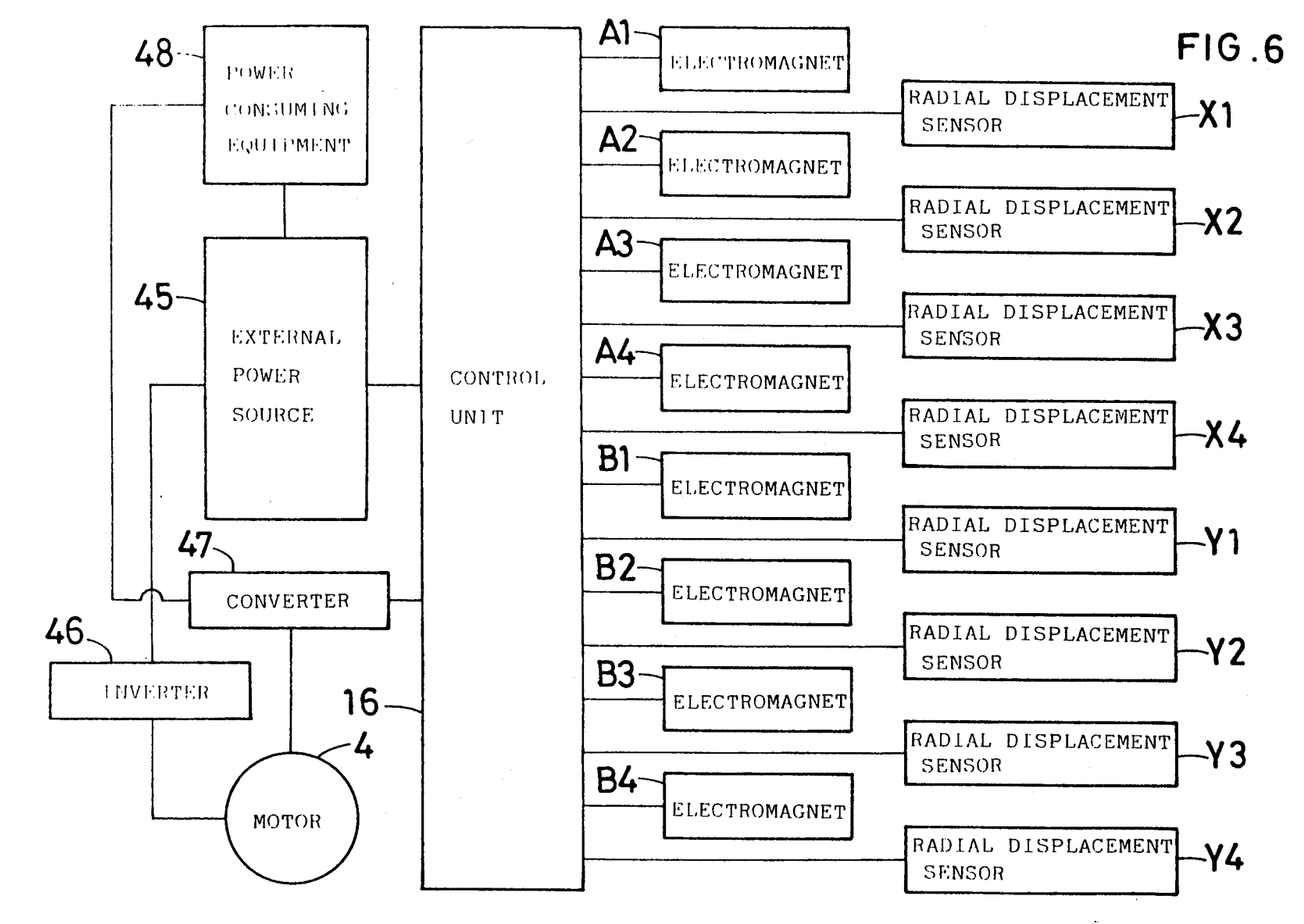
FIG. 6 is a block diagram showing the electrical construction of the bearing device shown in FIG. 4.

With reference to FIGS. 5 and 6, a control unit 16, which is identical to control unit 16 of FIG. 2, is connected to the eight electromagnets A1 to A4, B1 to B4 of the two magnetic bearing assemblies 3 and the radial displacement sensors X1 to X4, Y1 to Y4 as in the case of the second embodiment. The control unit 16 has connected thereto an external power source 45 for driving the unit. The power source 45 supplies power to a high-frequency electric motor 4 via an inverter 46, whereby the motor 4 is driven. External power consumption equipment 48 is connected via a converter 47 to the motor 4. Usually, the external power source 45 supplies power to the equipment 48. In the event of power failure, the high-frequency electric motor 4 acts as a generator, and the power produced is supplied to the equipment 48 by way of the converter 47.

With the power storage apparatus described, the vacuum chamber 40 contains a vacuum, and the rotary body 1 is rotated by the high-frequency motor 4. The rotary body 1 is initially set in position by the unillustrated lift member and the magnetic bearing assemblies 3. While the rotary body 1 is in stable rotation, electrical energy is converted to rotational kinetic energy, which in turn is stored in the flywheel 41. Before stable rotation is attained after the start of operation, the deflection of the rotary body 1 is corrected and the rotary body 1 is supported relative to the fixed portion in a noncontact state in the same manner as in the foregoing first embodiment.

In the event of power failure while the rotary body 1 is in stable rotation, the electric motor 4 comes to a stop, whereas the rotary body 1 is continuously rotated by the flywheel 41 although at a slightly reduced speed. As a result, the motor 4 acts as a generator, and the power obtained is sent to the external power consumption equipment 48 via the converter 47. In the meantime, the power produced by the motor 4 serving as the generator is partly sent to the control unit 16 via the converter 47. Although the rotary body 1 is likely to deflect at a resonance point before the rotary body 1 comes to rest with diminution of the rotational kinetic energy stored in the flywheel 41, the deflection is detected by the radial displacement sensors X1 to X4, Y1 to Y4 for the control unit 16 to reduce the deflection by the magnetic bearing assemblies 3, whereby the rotary body 1 can be held in the noncontact state until the flywheel 41 comes to rest. Consequently, the kinetic energy stored in the flywheel 41 is efficiently fed to the external equipment 48 as electrical energy.

What is claimed is:

1. A bearing device comprising:
   a rotary body in the form of a shaft,
   a superconducting bearing assembly for supporting the rotary body in axial and radial directions relative to a fixed portion without contacting the rotary body, the superconducting bearing assembly including an annular permanent magnet portion fixedly mounted on the rotary body concentrically therewith and an annular superconductor portion disposed adjacently facing the permanent magnet portion,
   magnetic bearing means for supporting the rotary body for rotation about an axis of rotation relative to the fixed portion without contacting the rotary body, the magnetic bearing means being positioned axially away from the superconducting bearing assembly and including electromagnets for controlling positioning of the rotary body with respect to two radial directions orthogonal to each other, and
   a control unit for selectively energizing the electromagnets of the magnetic bearing means in response to resonation of the rotary body,
   whereby the electromagnets are driven only when the rotary body resonates.

2. A bearing device as defined in claim 1 wherein the magnetic bearing means is disposed at only one side of the superconducting bearing assembly.

3. A bearing device as defined in claim 1 wherein the magnetic bearing means comprises a first magnetic bearing assembly and a second magnetic bearing assembly respectively positioned on opposite sides of the superconducting bearing assembly.

4. A bearing device as defined in claim 1 which further comprises an electric motor driving said rotary body which includes a rotor attached to the rotary body, and a stator attached to the fixed portion and positioned around the rotor, a flywheel fixedly mounted on the rotary body, and means for converting kinetic energy stored in the flywheel during rotation of the rotary body to electrical energy when the electric motor is de-energized and supplying the electrical energy to the control unit.

5. A bearing device as recited in claim 1 wherein said annular superconductor portion is a type II superconductor and further including cooling means for cooling said superconductor portion during superconductive operation.

6. A bearing device as recited in claim 1 wherein operation of said magnetic bearing means and said superconducting bearing assembly provides resistance to both radial movement and axial movement of said rotary body.

7. A bearing device as recited in claim 1, wherein the electromagnets of said magnetic bearing means have axes positioned in a plane perpendicular to the axis of rotation of said rotary body, said electromagnets comprising a first group oriented parallel to an X-axis having a direction corresponding to one of said radial directions and a second group oriented parallel to a Y-axis having a direction corresponding to an other radial direction and which is perpendicular to said X-axis so that actuation of said electromagnets exerts magnetic force on said rotary body in a direction of one or the other of said axes.

8. A bearing device as recited in claim 7 additionally including a first group of radial displacement sensors for sensing radial displacement from a desired position of said rotary body in the direction of said X-axis and a second group of radial displacement sensors for sensing radial displacement of said rotary body in the direction of said Y-axis, said sensors providing sensor output signal indicative of an amount of radial displacement that is sensed and said control unit receiving said output signals and providing power output signals to required electromagnetics for moving said rotary body in a direction and amount necessary to reduce such radial displacement by moving said rotary body toward its desired position.

9. A bearing device as recited in claim 8 wherein said control unit includes a control circuit and comparator means for receiving sensor output signals from each radial displacement sensor and comparing such sensor output signals with a threshold voltage for providing an output signal to control circuit means when the sensor output signal exceeds the threshold voltage so that said control circuit means provides said power output signals to said electromagnets.

10. A bearing device as recited in claim 2, wherein the electromagnets of said magnetic bearing means have axes positioned in a plane perpendicular to the axis of rotation of said rotary body, said electromagnets comprising a first group oriented parallel to an X-axis having a direction corresponding to a first radial direction and a second group oriented parallel to a Y-axis having a direction corresponding to a second radial direction and which is perpendicular to said X-axis so that actuation of said electromagnets exerts magnetic force on said rotary body in a direction of one or the other of said axes.

11. A bearing device as recited in claim 10 additionally including a first group of radial displacement sensors for sensing radial displacement from a desired position of said rotary body in the direction of said X-axis and a second group of radial displacement sensors for sensing radial displacement of said rotary body in the direction of said Y-axis, said sensors providing sensor output signals indicative of an amount of radial displacement that is sensed and said control unit receiving said output signals and providing power output signals to required electromagnetics for moving said rotary body in a direction and amount necessary to reduce, such radial displacement by moving said rotary body toward its desired position.

12. A bearing device as recited in claim 11 wherein said control unit includes a control circuit and comparator means for receiving sensor output signals from each radial displacement sensor and comparing such sensor output signals with a threshold voltage for providing an output signal to control circuit means when the sensor output signal exceeds the threshold voltage so that said control circuit provides said power output signals to said electromagnets.

13. A bearing device as recited in claim 3 wherein the electromagnets of said magnetic bearing means have axes positioned in a plane perpendicular to the axis of rotation of said rotary body, said electromagnets comprising a first group oriented parallel to an X-axis having a direction corresponding to one of said radial directions and a second group oriented parallel to a Y-axis having a direction corresponding to an other radial direction and which is perpendicular to said X-axis so that actuation of said electromagnets exerts magnetic force on said rotary body in a direction of one or the other of said axes.

14. A bearing device as recited in claim 13 additionally including a first group of radial displacement sensors for sensing radial displacement from a desired position of said rotary body in the direction of said X-axis and a second group of radial displacement sensors for sensing radial displacement of said rotary body in the direction of said Y-axis, said sensors providing sensor output signals indicative of an amount of radial displacement that is sensed and control unit for receiving said output signals and providing power output signals to required electromagnetics for moving said rotary body in a direction and amount necessary to reduce such radial displacement by moving said rotary body toward its desired position.

15. A bearing device as recited in claim 14 wherein said control unit includes a control circuit and comparator means for receiving sensor output signals from each radial displacement sensor and comparing such sensor output signals with a threshold voltage for providing an output signal to control circuit means when the sensor output signal exceeds the threshold voltage so that said control circuit provides said power output signals to said electromagnets.

* * * * *